*(12)* United States Patent
Ramaiah et al.

(10) Patent No.: US 12,153,681 B2
(45) Date of Patent: Nov. 26, 2024

(54) SYSTEMS AND METHODS FOR IDENTIFYING FIRMWARE VERSIONS USING SPDM ALIAS CERTIFICATES

(71) Applicant: Dell Products, L.P., Round Rock, TX (US)

(72) Inventors: Dharma Bhushan Ramaiah, Bangalore (IN); Vineeth Radhakrishnan, Palakkad (IN); Mini Thottunkal Thankappan, Bangalore (IN); Shinose Abdul Rahiman, Bangalore (IN); Rama Rao Bisa, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 112 days.

(21) Appl. No.: 18/177,148

(22) Filed: Mar. 2, 2023

(65) Prior Publication Data
US 2024/0296226 A1    Sep. 5, 2024

(51) Int. Cl.
*G06F 21/57*    (2013.01)
*H04L 9/32*    (2006.01)

(52) U.S. Cl.
CPC .......... *G06F 21/572* (2013.01); *H04L 9/3236* (2013.01); *H04L 9/3263* (2013.01)

(58) Field of Classification Search
CPC .... G06F 21/572; H04L 9/3236; H04L 9/3263
See application file for complete search history.

(56) References Cited

U.S. PATENT DOCUMENTS

| | | | |
|---|---|---|---|
| 2012/0005480 A1* | 1/2012 | Batke | G06F 21/572 713/175 |
| 2020/0344265 A1* | 10/2020 | Kelly | H04L 63/0823 |
| 2021/0150013 A1* | 5/2021 | Duval | H04L 63/0876 |
| 2022/0188419 A1* | 6/2022 | Stremlau | G06F 8/65 |
| 2022/0222348 A1* | 7/2022 | Vaswani | H04L 9/0825 |
| 2022/0321361 A1* | 10/2022 | Ruan | H04L 9/0866 |
| 2022/0350586 A1* | 11/2022 | Moran | G06F 8/61 |
| 2023/0153440 A1* | 5/2023 | Youm | G06F 21/57 726/22 |
| 2023/0281312 A1* | 9/2023 | Hong | G06F 21/602 726/26 |
| 2023/0289433 A1* | 9/2023 | Kakaiya | G06F 21/74 |
| 2023/0353391 A1* | 11/2023 | Dover | H04L 9/3268 |
| 2023/0367575 A1* | 11/2023 | Izzo | H04L 9/0891 |
| 2024/0179014 A1* | 5/2024 | Ruan | H04L 9/0825 |

* cited by examiner

*Primary Examiner* — Faisal M Zaman
(74) *Attorney, Agent, or Firm* — Fogarty LLP

(57) ABSTRACT

According to embodiments of the present disclosure, an Information Handling System (IHS), systems and methods for identifying firmware versions of a firmware image using SPDM alias certificates are disclosed. In one embodiment, an IHS includes a Security Protocol and Data Model (SPDM)-enabled device conforming to a SPDM specification, and computer-executable instructions to receive a request to attest a firmware image, generate an alias certificate using a hash of the firmware and version information associated with the firmware in response to the request, and using the alias certificate, attest the version of the firmware image using the version information.

20 Claims, 5 Drawing Sheets

SYSTEMS AND METHODS FOR IDENTIFYING FIRMWARE VERSIONS USING SPDM ALIAS CERTIFICATES

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of trust provided thereby.

SUMMARY

According to embodiments of the present disclosure, an Information Handling System (IHS), systems and methods for identifying firmware versions of a firmware image using SPDM alias certificates are disclosed. In one embodiment, an IHS includes a Security Protocol and Data Model (SPDM)-enabled device conforming to a SPDM specification, and computer-executable instructions to receive a request to attest a firmware image, generate an alias certificate using a hash of the firmware and version information associated with the firmware in response to the request, and using the alias certificate, attest the version of the firmware image using the version information.

According to another embodiment, a secure firmware version identification method includes the steps of receiving a request to attest a firmware image deployed on a Security Protocol and Data Model (SPDM)-enabled device conforming to a SPDM specification, in response to the request, generating an alias certificate using a hash of the firmware and version information associated with the firmware, and using the alias certificate, attesting the version of the firmware image using the version information.

According to yet another embodiment, a computer program product includes computer-executable instructions to receive a request to attest a firmware image associated with a Security Protocol and Data Model (SPDM)-enabled device conforming to a SPDM specification, in response to the request, generate an alias certificate using a hash of the firmware and version information associated with the firmware, and using the alias certificate, attest the version of the firmware image using the version information.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
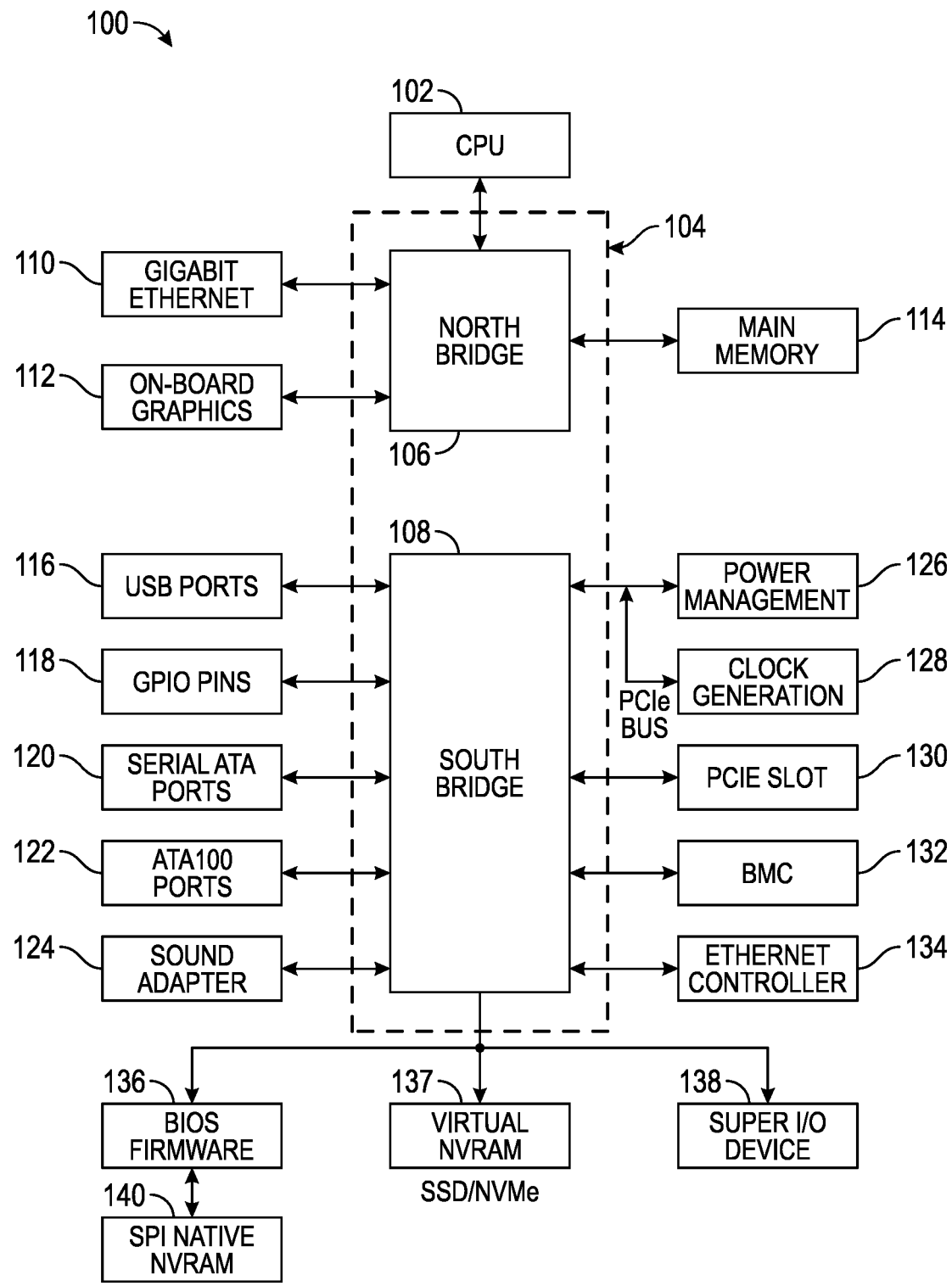
FIG. 1 shows an example of an Information Handling System (IHS) that may be configured to implement a system and method for firmware version identification according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with Baseboard management controllers (BMCs) that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Various standards have been proposed to more effectively interconnect and operate PCIe devices. These include the specialization of communication standards distributed by groups such as the Institute of Electrical and Electronics Engineers (IEEE), and those that specify security requirements and approaches for IoT and distributed device settings are also being proposed by the Trusted Computing Group (TCG). The Distributed Management Task Force (DMTF), for example, defines a standard to allow cryptographic authentication of devices in a computer system that may be referred to as a Security Protocol and Data Model (SPDM). These security contexts are enabled through the use of various hardware components with security approaches enabled by a Trusted Computing Group (TCG) Device Identifier Composition Engine (DICE) implementation.

BMCs are particularly well suited for the features provided by the SPDM specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which support peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

IHSs, such as servers used in an Information Technology (IT) data center domain, may each be configured with numerous devices (e.g., Network Interface Cards (NICs), Input/Output devices, etc.). Each device may be configured with its own unique hardware device identity and firmware version. SPDM provides a way to attest each device in the server. When an external entity (e.g., console) attests the server, the BMC may be required to provide each component's hardware identity and firmware measurements. In SPDM, alias certificates are derived from a Unique Device Identity (UDI) of the underlying SPDM-enabled device (e.g., the hardware) and the firmware deployed on the SPDM-enabled device. The firmware functions as a seeding value for the Key Derivation Function (KDF). Thus, the alias keys may indicate the version of the firmware is implicitly used.

While the alias certificate keypair may indicate the version, it is not readable. As a Unique Device Secret (UDS) gets involved in the seeding process, the key pair in the alias certificate does not indicate the firmware version. In data centers, users (e.g., administrators) usually update the firmware of the devices and BMCs when critical fixes for vulnerabilities are available. Also, firmware updates for security vulnerabilities are usually prioritized over functional upgrades. Users typically rely on release notes of the vendor and what is reported either by the BMC or device to examine the current version of firmware, and determine whether to update the firmware. Currently the firmware versions are stored in a plain text format, an attacker or an existing vulnerability can easily tamper with the version, which is normally stored at a fixed location, and thereby deceive the user from updating the firmware. As such, no reliable evidence exists that the hardware is booted from the version it reported and/or from the trusted hardware.

As will be described in detail herein below, embodiments of the present disclosure provide a system and method for identifying firmware versioning using SPDM alias certificates in an IHS. In one embodiment, the secure firmware identification system, upon receiving a request to attest a firmware image, generates an alias certificate using a hash of the firmware and version information associated with the firmware, and attests the firmware image using the alias cert. In this manner, the verifier of an alias certificate can directly map the firmware measurement and thus the version for the firmware from the alias certificate node. Additionally, version information is cryptographically bound and can be used to make decisions on whether the currently running firmware is free from known vulnerabilities. Also, the alias certificate can also be helpful for use as measurement information.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
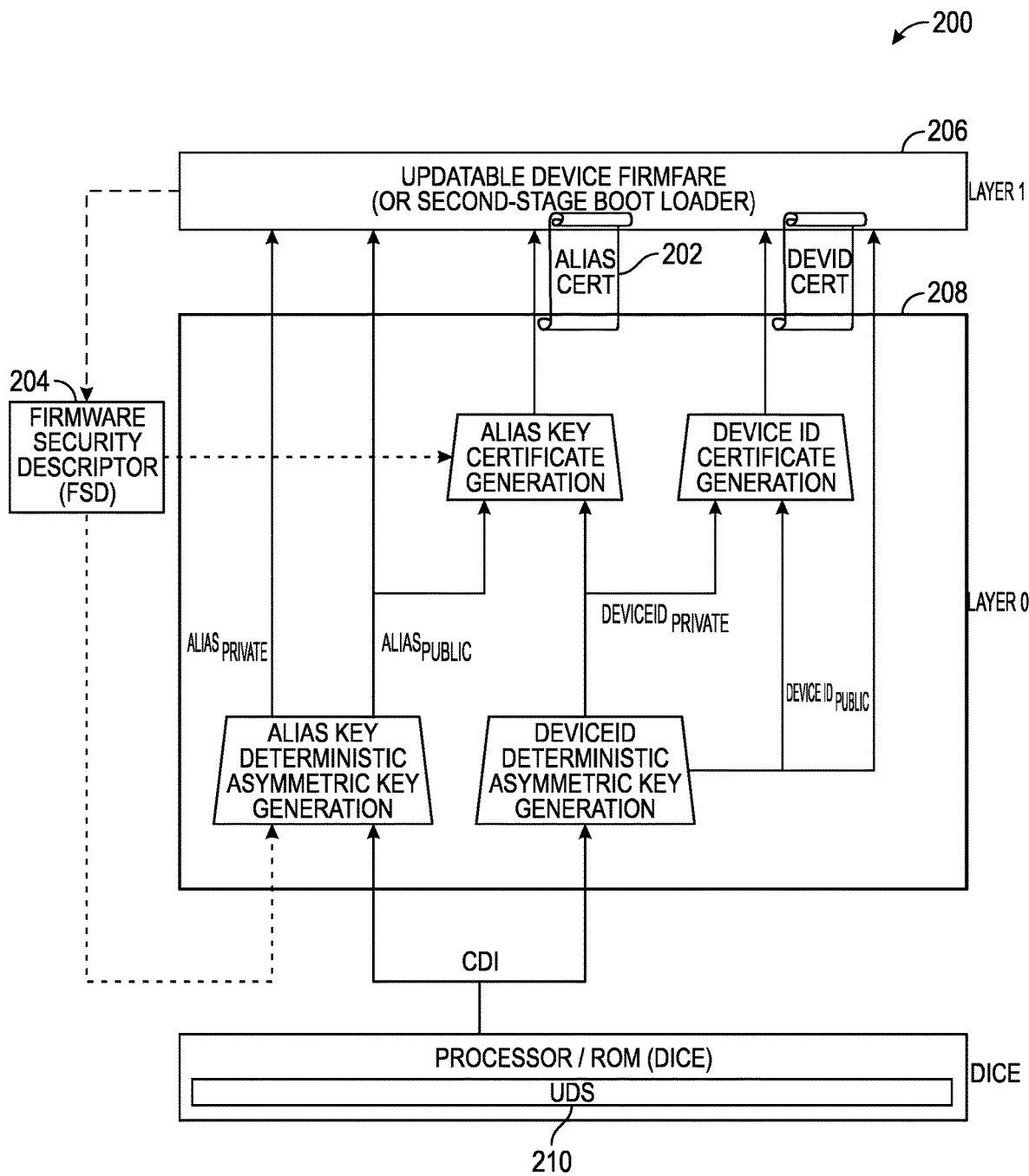
FIG. 2 illustrates an example alias certificate key derivation block diagram showing how an alias certificate may be generated with a Firmware Security Descriptor (FSD) to provide trust in versioning information reported about a firmware image according to one embodiment of the present disclosure.

FIG. 2 illustrates an example alias certificate key derivation block diagram showing how an alias certificate 202 may be generated with a Firmware Security Descriptor (FSD) 204 to provide trust in versioning information reported about a firmware image 206 according to one embodiment of the present disclosure. As shown, the firmware image 206 may be deployed (e.g., installed) on a hardware device, such as a SPDM-enabled device 208, and according to the DICE architecture, the certificate associated with the firmware image 206 exists at either of Layer 1, while the certificate associated with the SPDM-enabled device 208 exists at Layer 0. In other embodiments, the certificate associated with the firmware image 206 exists at either of Layers 1-7. The SPDM-enabled device 208 obtains its Root-of-Trust (RoT) from a Unique Device Secret (UDS) 210, which may exist as a per-device hardware-level secret accessible to the RoT, but not accessible after the UDS 210 is started.

The UDS 210 may include any combination of components that provide a RoT for the firmware image 206. In one embodiment, the UDS 210 may include a BMC 132 or a console that functions as an interface to monitor and control the operation of one or more SPDM-enabled devices 208 configured in an IHS 100 as will be described in detail herein below. Examples of SPDM-enabled devices 204a-n may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, Super I/O device 138, and BMC 132 as described herein above.

According to embodiments of the present disclosure, the FSD 204 may be included with metadata associated with the firmware image 206, such as version information associated with the firmware image 206. In some embodiments, the FSD 204 may be included with other information about the firmware image 206, such as a release date of the firmware image 206, a date and/or time that the firmware image 206 was deployed on the SPDM-enabled device 208, and the like. Because the FSD 204 is used to generate the alias certificate 202, the information in the FSD 204 is cryptographically bound to the underlying device, which in the present embodiment, is the SPDM-enabled device 208. In one embodiment, the FSD 204 (e.g., version information associated with the firmware image 208) may be stored in a readable field of the alias certificate information. In another embodiment, the FSD 204 may be stored (e.g., updated) in the "Subject-Common Name" field of the alias certificate 202. Imparting the FSD 204 in a readable field of the alias certificate information may provide for secure auditing of the firmware image 206 as will be described in detail herein below.

Figure 3:
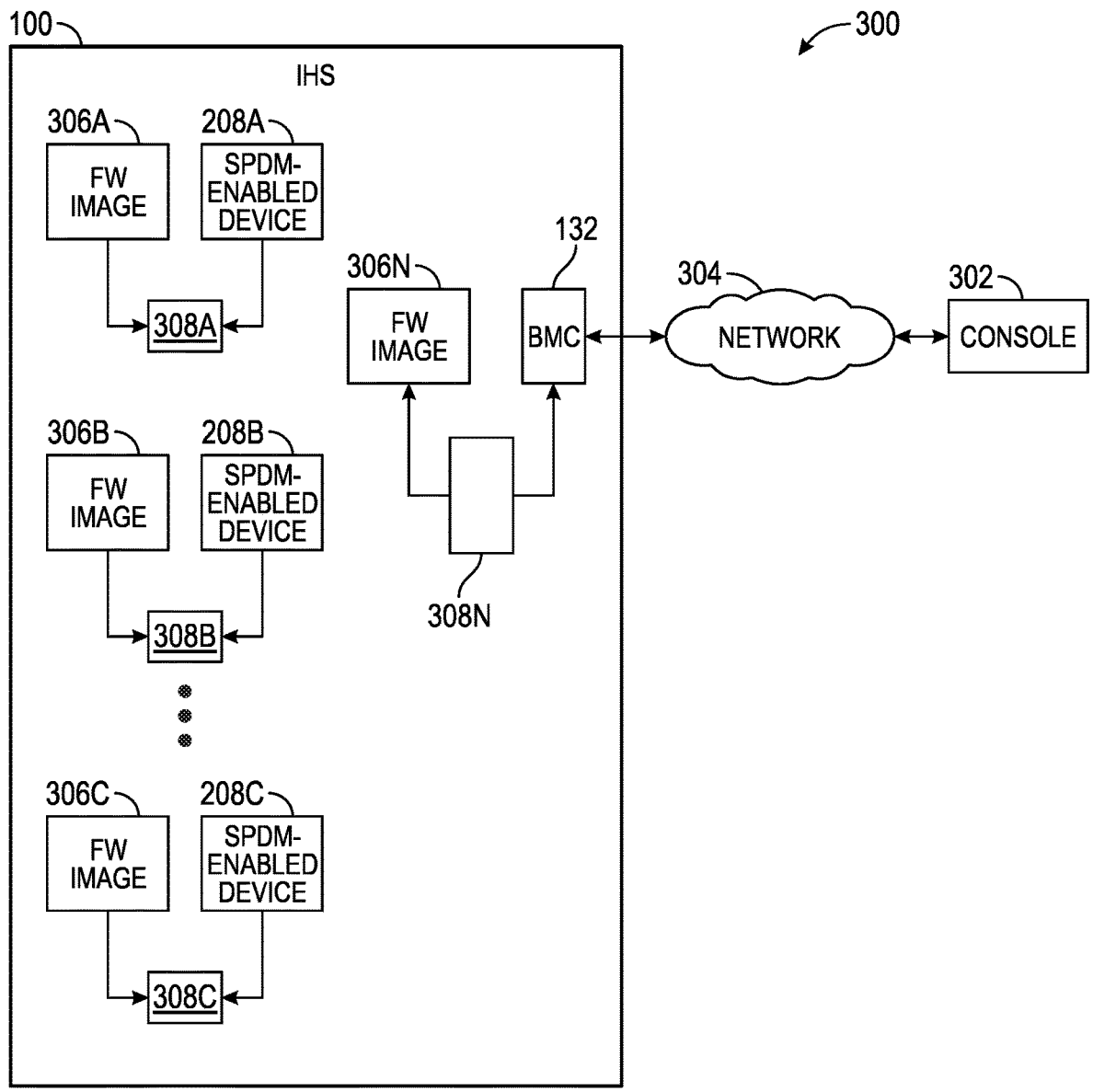
FIG. 3 illustrates another example SPDM-based secure firmware identification system according to one embodiment of the present disclosure.

FIG. 3 illustrates another example SPDM-based secure firmware identification system 300 according to one embodiment of the present disclosure. The system 300 includes a console 302 communicatively coupled to a BMC 132 configured in an IHS 100 over a network 304, which may be any suitable type, such as a local area network (LAN) or a Wide Area Network (WAN) (e.g., the Internet). The console 302 may use the BMC 132 to manage and control one or more SPDM-enabled devices 208a-c (collectively 208) in the IHS 100. As shown, each SPDM-enabled device 208 may be configured with a firmware image 306a-n (collectively 306) that is attested by the console 302 using an alias certificate 308a-n (collectively 308).

According to embodiments of the present disclosure, the console 302 may be configured with executable instructions to communicate with the BMC 132 for auditing the firmware image 306a-c of each SPDM-enabled device 208a-c as well as the firmware image 306n installed on the BMC 132. In one embodiment, each of the firmware images 306 may be audited each time its associated BMC 132 or SPDM-enabled device 208 is re-booted. The console 302 reads version information stored in each alias certificate 308 as the firmware image 306 is being attested, determines whether the firmware image 306 is invalid, and if so, performs one or more remedial actions based on the determination. For example, the console 302 may compare the version information obtained from the alias certificate 308 against known valid and invalid version values for that BMC 132 or SPDM-enabled device 208, and performs one or more remedial actions when the console 302 determines that the version is invalid. Examples of remedial actions may include stopping communication with the SPDM-enabled device 208 or BMC 132, disabling a slot associated with the SPDM-enabled device 208 or BMC 132, and generating an alert message notifying a user (e.g., administrator) of the discrepancy.

To provide a particular example, it is known that a particular SPDM-enabled device 208 (e.g., NIC card) should be valid when installed with a firmware version in the range of version 3.2 to 4.7 with the exception of version 4.1.2, which has been proven to possess a vulnerability. As such, when the console 302 obtains the version information from the alias certificate 308, it may also obtain information about valid firmware versions for that type of NIC card, and compare the received version information to verify its validity. In some embodiments, the console 302 may store dependency information associated with each BMC 132 and SPDM-enabled device 208. For example, a firmware version of a firmware image 306 installed on a first SPDM-enabled device 208 may require that the firmware version of a firmware image 306 on a second SPDM-enabled device 208 be a certain version or within a certain range of versions. When the console 302 encounters such a scenario, it may check the version information from other SPDM-enabled devices 208 in the IHS 100 to ensure that the dependency is satisfied.

While the present embodiment shows the secure firmware identification system implemented on a console 302 and an IHS 100 with a BMC 132 configured to manage the operation of a SPDM-enabled device 208, it should be appreciated that the secure firmware identification system may be implemented on any suitable combination of devices in which one device functions as a requester while another device functions as a responder to the requester within the purpose and meaning of the SPDM specification.

Figure 4:
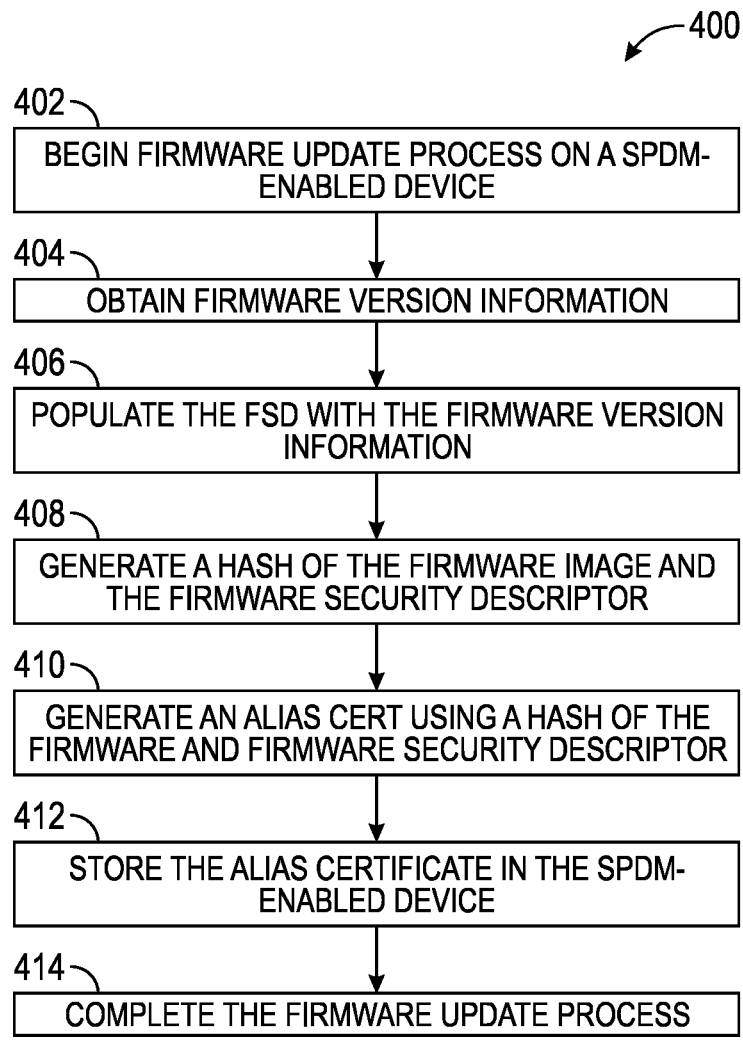
FIG. 4 illustrates an example secure firmware update method that may be performed to generate an alias certificate that includes a FSD including firmware version information according to one embodiment of the present disclosure.

FIG. 4 illustrates an example secure firmware update method 400 that may be performed to generate an alias certificate 202 that includes a FSD 204 including firmware version information according to one embodiment of the present disclosure. Additionally or alternatively, the secure firmware update method 400 may be performed at least in part, by the secure firmware identification system 200 or 300 as described herein above with reference to FIGS. 2 and/or 3.

At step 402, the secure firmware update method 400 commences deploying (e.g., installing) a firmware image 206 on a SPDM-enabled device 208. The firmware image 206 may be a new firmware image or a firmware update to an existing firmware image that has been previously deployed on the SPDM-enabled device 208. Thereafter at step 404, the secure firmware update method 400 obtains firmware version information from the firmware image. For example, the secure firmware update method 400 may read the metadata portion of the firmware image 206 to identify its firmware version, release date, and the like. The secure firmware update method 400 then populates the FSD 204 with the firmware version information such as described above at step 406. The secure firmware update method may also populate the FSD 204 with a date and time at which the firmware image 206 is installed, which in the present embodiment, is the current date and time.

At step 408, the secure firmware update method 400 generates a hash of the firmware image 206 and the FSD 204, and generates an alias certificate 202 using the hash of the firmware and the FSD 204 at step 410. Thus, the alias certificate 202 includes version information about the firmware image 206, which can be extracted at a later point in time to verify the version of the firmware image 206. The secure firmware update method 400 then stores the alias certificate 202 in a secure memory portion of the SPDM-enabled device 208 at step 412. Because the alias certificate 202 is stored in the secure memory portion of the SPDM-enabled device 208, it is immutable by the firmware image 206 running on the SPDM-enabled device 208. Additionally, the version information is persisted until the next firmware update process is performed. Then at step 414, the secure firmware update method 400 completes the firmware update process on the SPDM-enabled device 208 in which the secure firmware update method 400 ends.

Although FIG. 4 describes an example method 400 that may be performed to impart version information associated with a firmware image 206 deployed on a SPDM-enabled device 208, the features of the method 400 may be embodied in other specific forms without deviating from the spirit and scope of the present disclosure. For example, the method 400 may perform additional, fewer, or different operations than those described above. For another example, the method 400 may be performed in a sequence of steps different from that described above. As yet another example, certain steps of the method 400 may be performed by other components than those described above, such as by the BIOS configured in the IHS 100.

Figure 5:
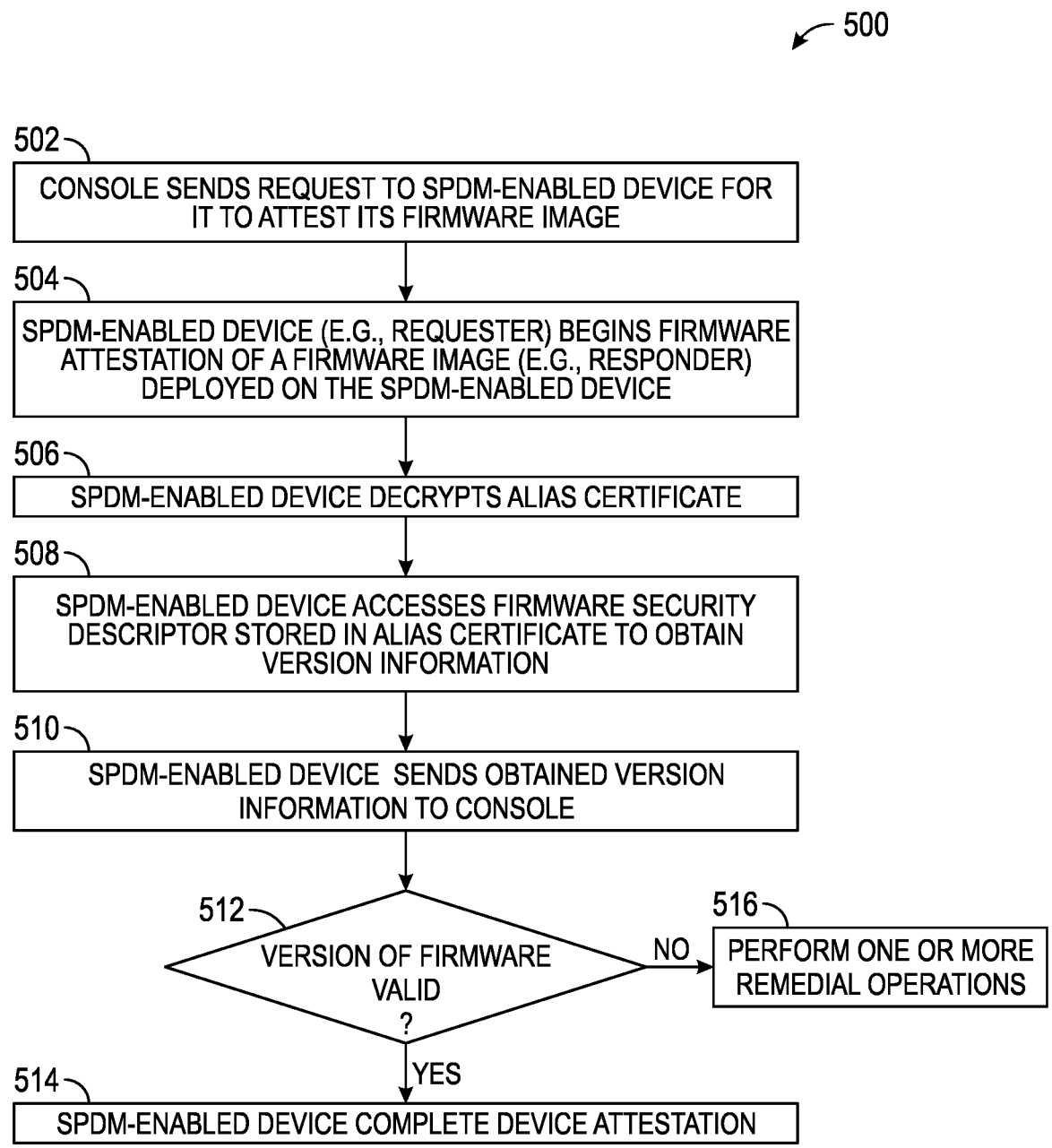
FIG. 5 illustrates an example secure firmware identification method that may be performed to securely identify firmware information according to one embodiment of the present disclosure.

FIG. 5 illustrates an example secure firmware identification method 500 that may be performed to securely identify firmware information according to one embodiment of the present disclosure. Additionally or alternatively, the secure firmware identification method 500 may be performed at least in part, by the secure firmware identification system 300 as described herein above with reference to FIG. 3. The secure firmware identification method 500 may be performed at any suitable time after the secure firmware identification method 400 as described above with reference to FIG. 4 is performed, such as when the IHS 100 is re-booted, when a particular SPDM-enabled device 208 or group of SPDM-enabled devices are re-booted, at ongoing intervals (e.g., periodically), whenever the integrity of at least one of the SPDM-enabled devices 208 in an IHS 100 is questioned, or following a firmware update to one or more SPDM-enabled devices 208 in the IHS 100.

At step 502, the console 302 sends a request to an SPDM-enabled device 208 for it to attest its firmware image 206. In response, the SPDM-enabled device (e.g., requester) 208 begins firmware attestation of a firmware image (e.g., responder) deployed on the SPDM-enabled device at step 504. The SPDM-enabled device 208 then obtains and decrypts the alias certificate 202 associated with the firmware image 206 at step 506, accesses the FSD 204 from the alias certificate 202 to obtain the version information associated with the firmware image 206 at step 508, and sends the obtained version information to the console 302 at step 510.

At step 512, the console 302 compares the version information retrieved in the alias certificate with its reference firmware version information to determine whether the version of the firmware image 206 is valid. If the version of the firmware image 206 is valid, processing continues at step 514 in which the SPDM-enabled device 208 completes its firmware image attestation. For example, the console 302 may send a message to the SPDM-enabled device 208 indicating that the version of the firmware image 206 was valid and that the SPDM-enabled device 208 may complete its attestation of the firmware image 206. Otherwise if the console 302 determines that the version of the firmware image 206 is invalid, the console 206 may communicate with the SPDM-enabled device 208 to perform one or more remedial actions at step 516.

The console 302 and/or SPDM-enabled device 208 may perform any suitable remedial actions if and when the version of the firmware image 206 has been deemed to be invalid. In one embodiment, the console 302 may communicate with the SPDM-enabled device 208 to disable or at least partially disable operation of the IHS 100 or SPDM-enabled device 208 when its firmware version is deemed to be invalid. For example, the console 302 may communicate with the BMC 132 to stop communicating with the SPDM-enabled device 208, or disable a slot that the SPDM-enabled device 208 is plugged into. For another example, the console 302 may communicate with the SPDM-enabled device 208 to place the IHS 100 in a failsafe mode of operation, and prompt personnel (e.g., using an alert message) to investigate the source of the invalid firmware version.

While the steps described above were directed to verifying a firmware version of a firmware image 206 deployed on a single SPDM-enabled device 208, improving a system time trustworthiness of a single BMC 132, it should be appreciated that the secure firmware identification method 500 may be concurrently performed to attest the firmware versions of multiple firmware images 206 deployed on multiple SPDM-enabled devices 208. Nevertheless, when use of the secure firmware identification method 500 is no longer needed or desired, the method 500 ends.

Although FIG. 5 describes an example method 500 that may be performed to verify a firmware version of a firmware image 206 deployed on a SPDM-enabled device 208, the features of the method 500 may be embodied in other specific forms without deviating from the spirit and scope of the present disclosure. For example, the method 500 may perform additional, fewer, or different operations than those described above. For another example, the method 500 may be performed in a sequence of steps different from that described above. As yet another example, certain steps of the method 500 may be performed by other components than those described above, such as by the BIOS configured in the IHS 100.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a Security Protocol and Data Model (SPDM)-enabled device conforming to a SPDM specification, wherein the SPDM-enabled device comprises at least one memory coupled to at least one processor, the at least one memory having program instructions stored thereon that, upon execution by the at least one processor, cause the instructions to:
receive a request to attest a firmware image;
in response to the request, generate an alias certificate using a hash of the firmware and version information associated with the firmware; and
using the alias certificate, attest the version of the firmware image using the version information.

2. The IHS of claim 1, wherein the program instructions, upon execution, further cause IHS to generate the alias certificate when the firmware image is deployed on the SPDM-enabled device.

3. The IHS of claim 1, wherein the program instructions, upon execution, further cause IHS to attest the version of the firmware image each time the firmware image is attested.

4. The IHS of claim 1, wherein the program instructions, upon execution, further cause IHS to:
determine whether the version of the firmware image is invalid; and
perform one or more remedial actions based on the determination.

5. The IHS of claim 4, wherein the remedial actions comprise at least one of sending an alert message indicating the invalid firmware version, stopping communication with the SPDM-enabled device, and disabling a slot that the SPDM-enabled device is plugged into.

6. The IHS of claim 4, wherein the acts of determining whether the version of the firmware image is invalid and performing one or more remedial actions are performed by a console that manages the IHS.

7. The IHS of claim 1, wherein the program instructions, upon execution, further cause IHS to store the version information in a readable field of the alias certificate.

8. The IHS of claim 1, wherein the program instructions, upon execution, further cause IHS to store the version information in a subject common name filed of the alias certificate.

9. A secure firmware version identification method comprising:
receiving a request to attest a firmware image deployed on a Security Protocol and Data Model (SPDM)-enabled device conforming to a SPDM specification;
in response to the request, generating an alias certificate using a hash of the firmware and version information associated with the firmware; and
using the alias certificate, attesting the version of the firmware image using the version information.

10. The secure firmware version identification method of claim 9, further comprising generating the alias certificate when the firmware image is deployed on the SPDM-enabled device.

11. The secure firmware version identification method of claim 9, further comprising attesting the version of the firmware image each time the firmware image is attested.

12. The secure firmware version identification method of claim 9, further comprising:
determining whether the version of the firmware image is invalid; and
performing one or more remedial actions based on the determination.

13. The secure firmware version identification method of claim 12, further comprising performing the acts of determining whether the version of the firmware image is invalid and performing one or more remedial actions using a console that manages an Information Handling System (IHS) associated with the SPDM-enabled device.

14. The secure firmware version identification method of claim 9, further comprising storing the version information in a readable field of the alias certificate.

15. The secure firmware version identification method of claim 9, further comprising storing the version information in a subject common name filed of the alias certificate.

16. A computer program product comprising a non-transitory computer readable storage medium having program instructions stored thereon that, upon execution by an Information Handling System (IHS), cause the IHS to:
    receive a request to attest a firmware image associated with a Security Protocol and Data Model (SPDM)-enabled device conforming to a SPDM specification;
    in response to the request, generate an alias certificate using a hash of the firmware and version information associated with the firmware; and
    using the alias certificate, attest the version of the firmware image using the version information.

17. The computer program product of claim 16, wherein the program instructions, upon execution, further cause IHS to generate the alias certificate when the firmware image is deployed on the SPDM-enabled device.

18. The computer program product of claim 16, wherein the program instructions, upon execution, further cause IHS to:
    determine whether the version of the firmware image is invalid; and
    perform one or more remedial actions based on the determination.

19. The computer program product of claim 18, wherein the remedial actions comprise at least one of sending an alert message indicating the invalid firmware version, stopping communication with the SPDM-enabled device, and disabling a slot that the SPDM-enabled device is plugged into.

20. The computer program product of claim 18, wherein the acts of determining whether the version of the firmware image is invalid and performing one or more remedial actions are performed by a console that manages the IHS.

* * * * *